(12) United States Patent
Ochiai

(10) Patent No.: US 10,816,248 B2
(45) Date of Patent: Oct. 27, 2020

(54) REFRIGERATION CYCLE APPARATUS

(71) Applicant: Mitsubishi Electric Corporation, Chiyoda-ku, Tokyo (JP)

(72) Inventor: Yasutaka Ochiai, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 80 days.

(21) Appl. No.: 16/306,529

(22) PCT Filed: Jun. 9, 2016

(86) PCT No.: PCT/JP2016/067230
§ 371 (c)(1),
(2) Date: Nov. 30, 2018

(87) PCT Pub. No.: WO2017/212606
PCT Pub. Date: Dec. 14, 2017

(65) Prior Publication Data
US 2019/0293331 A1    Sep. 26, 2019

(51) Int. Cl.
*F25B 49/02*    (2006.01)
*F25B 13/00*    (2006.01)

(52) U.S. Cl.
CPC .............. *F25B 49/02* (2013.01); *F25B 13/00* (2013.01); *F25B 2313/004* (2013.01);
(Continued)

(58) Field of Classification Search
CPC .......... F25B 2700/2103; F25B 27/0015; F25B 27/1933; F25B 2700/1931;
(Continued)

(56) References Cited

U.S. PATENT DOCUMENTS 4,505,125 A * 3/1985 Baglione ................ F25B 49/02
62/209
4,563,878 A * 1/1986 Baglione ................ F25B 49/02
62/115
(Continued)

FOREIGN PATENT DOCUMENTS

CN    103423835 A    12/2013
CN    105008827 A    10/2015
(Continued)

OTHER PUBLICATIONS

Office Action (Notice of Reasons for Refusal) dated Aug. 6, 2019, by the Japan Patent Office in corresponding Japanese Patent Application No. 2018-522252, and an English translation of the Office Action. (8 pages).
(Continued)

*Primary Examiner* — Nelson J Nieves
(74) *Attorney, Agent, or Firm* — Buchanan Ingersoll & Rooney PC

(57) ABSTRACT

A refrigeration cycle apparatus in which a compressor, a heat-source-side heat exchanger, a decompressor, and a use-side heat exchanger are connected by pipes to allow refrigerant to be circuited as a refrigeration cycle. The refrigeration cycle apparatus includes a controller which controls an operation of each of devices. The controller sets an operation mode to a specific operation mode for determining where abnormality occurs based on states of the compressor, the heat-source-side heat exchanger, the decompressor and the use-side heat exchanger in the case where an operating state of one of a plurality of element devices to be controlled by the controller is changed from a first state to a second state, the element devices being included in the compressor, the heat-source-side heat exchanger, the decompressor and the use-side heat exchanger.

11 Claims, 10 Drawing Sheets

(52) U.S. Cl.
CPC ............... *F25B 2313/0293* (2013.01); *F25B 2313/0294* (2013.01); *F25B 2313/02741* (2013.01); *F25B 2313/0314* (2013.01); *F25B 2313/0315* (2013.01); *F25B 2400/06* (2013.01); *F25B 2400/075* (2013.01); *F25B 2600/0253* (2013.01); *F25B 2600/11* (2013.01); *F25B 2600/111* (2013.01); *F25B 2600/112* (2013.01); *F25B 2600/13* (2013.01); *F25B 2600/21* (2013.01); *F25B 2600/2513* (2013.01); *F25B 2700/15* (2013.01); *F25B 2700/1931* (2013.01); *F25B 2700/1933* (2013.01); *F25B 2700/2103* (2013.01); *F25B 2700/2104* (2013.01); *F25B 2700/2106* (2013.01); *F25B 2700/21152* (2013.01)

(58) Field of Classification Search
CPC .... F25B 2700/21152; F25B 2700/2106; F25B 2700/2104; F25B 2313/004; F25B 2313/0314; F25B 2313/0293; F25B 2313/0315; F25B 2313/02741; F25B 2313/0294; F25B 2600/111; F25B 2600/13; F25B 2600/112; F25B 2600/2513; F25B 2600/0253; F25B 2600/11; F25B 2600/21; F25B 2400/06; F25B 2400/075; F25B 49/02; F25B 13/00
See application file for complete search history.

(56) References Cited

U.S. PATENT DOCUMENTS

| 2011/0174005 | A1* | 7/2011 | Takegami | ................ | F25B 1/10 |
| | | | | | 62/228.1 |
| 2013/0098083 | A1* | 4/2013 | Kong | ................ | F25D 29/00 |
| | | | | | 62/129 |
| 2013/0312443 | A1* | 11/2013 | Tamaki | ................ | F24D 19/1054 |
| | | | | | 62/228.1 |
| 2014/0238060 | A1 | 8/2014 | Tamaki et al. | | |
| 2014/0260388 | A1 | 9/2014 | Umeda et al. | | |
| 2015/0330675 | A1* | 11/2015 | Tamaki | ................ | F25B 13/00 |
| | | | | | 62/324.1 |
| 2017/0268811 | A1* | 9/2017 | Ochiai | ................ | F24F 11/36 |
| 2017/0343259 | A1* | 11/2017 | Cai | ................ | F25B 41/043 |
| 2018/0094822 | A1* | 4/2018 | Tada | ................ | F24F 1/38 |
| 2019/0113264 | A1* | 4/2019 | Tsukiyama | ................ | F25B 1/10 |

FOREIGN PATENT DOCUMENTS

| EP | 3 023 716 A1 | 5/2016 |
| JP | 2000006802 A | 1/2000 |
| JP | 2002147818 A | 5/2002 |
| JP | 2008249234 A | 10/2008 |
| JP | 2009018770 A | 1/2009 |
| JP | 2011-220624 A | 11/2011 |
| JP | 2016508590 A | 3/2016 |
| WO | 2016/071947 A1 | 5/2016 |

OTHER PUBLICATIONS

International Search Report (with English Translation) and Written Opinion issued in corresponding International Patent Application No. PCT/JP2016/067230, 15 pages, dated Sep. 6, 2016.

Extended European Search Report dated May 29, 2019, issued by the European Patent Office in corresponding European Application No. 16904641.4. (8 pages).

Office Action dated May 8, 2020, by the Chinese Patent Office in corresponding Chinese Patent Application No. 201680086325.3 and English translation of the Office Action. (17 pages).

* cited by examiner

REFRIGERATION CYCLE APPARATUS

TECHNICAL FIELD

The present invention relates to a refrigeration cycle apparatus which is applied to multi-air-conditioning apparatuses for building, vehicle air-conditioning apparatuses, etc.

BACKGROUND ART

In a conventional proposed method, the operations states of structural components of a refrigeration cycle apparatus, such as a compressor and a fan, are fixed, and in this state, it is detected whether abnormality occurs or not, and then a factor in occurrence of a detected abnormality is specified. For example, Patent Literature 1 describes that it is determined whether a differential value between a set value and a measured value of a structural component exceeds an allowable range or not, and when the number of times it is determined that the differential value exceeds the allowable range exceeds a set number, it is determined that abnormality occurs in the structural component, and that the structural component may fail.

CITATION LIST

Patent Literature

Patent Literature 1: Japanese Unexamined Patent Application Publication No. 2009-18770

SUMMARY OF INVENTION

Technical Problem

However, in the method described in Patent Literature 1, although it is possible to detect abnormality in a structural component of the refrigeration cycle apparatus, it is hard to determine a factor in occurrence of the abnormality. For example, in the case where a measured value greatly differs from a set value, it is not possible to determine whether abnormality occurs in the structural component itself or in a sensor configured to measure the measured value, or another element.

The present invention has been made to solve the problem of the above conventional technique, and an object of the invention is to provide a refrigeration cycle apparatus which can determine where abnormality occurs.

Solution to Problem

In a refrigeration cycle compressor according to an embodiment of the present invention, a compressor, a heat-source-side heat exchanger, a pressure-reducing device and a use-side heat exchanger are connected by pipes to allow refrigerant to be circulated as a refrigeration cycle. The refrigeration cycle apparatus includes a controller which controls an operation of each of the compressor, the heat-source-side heat exchanger, the pressure-reducing device and the use-side heat exchanger device. The controller sets an operation mode to a specific operation mode for determining whether abnormality occurs based on states of the compressor, the heat-source-side heat exchanger, the pressure-reducing device and the use-side heat exchanger in the case where an operating state of one of a plurality of element devices to be controlled by the controller is changed from a first state to a second state, the element devices being included in the compressor, the heat-source-side heat exchanger, the pressure-reducing device and the use-side heat exchanger.

Advantageous Effects of Invention

As described above, the refrigeration cycle apparatus according to an embodiment of the present invention can determine where abnormality occurs, by checking the state of each of a plurality of devices when the state of one of a plurality of element devices is changed.

DESCRIPTION OF EMBODIMENTS

Embodiment 1

A refrigeration cycle apparatus according to embodiment 1 of the present invention will be described below.
[Configuration of Refrigeration Cycle Apparatus]

Figure 1:
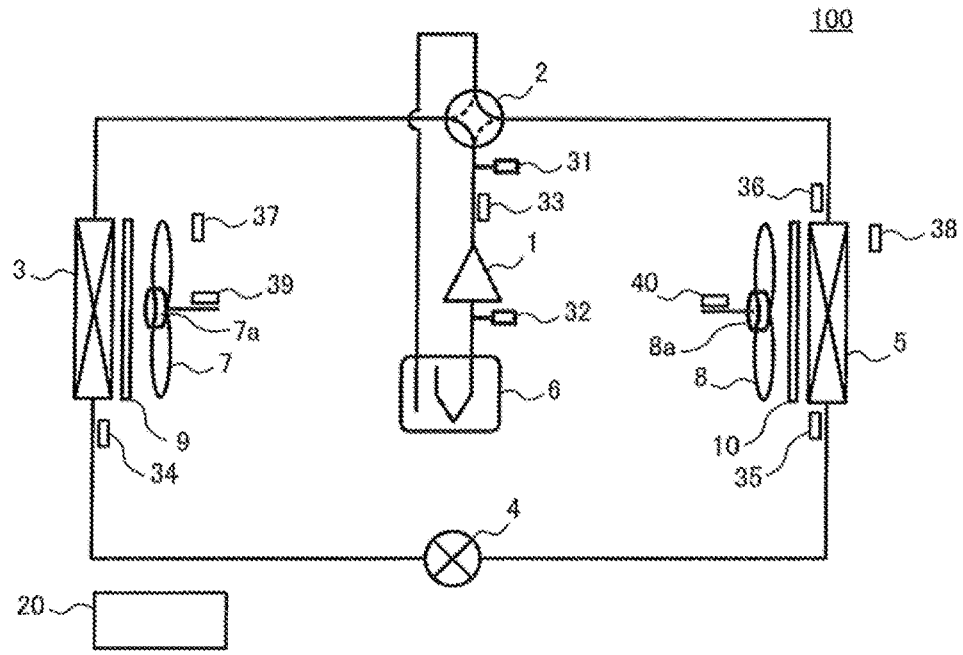
FIG. 1 is a block diagram illustrating an example of the configuration of a refrigeration cycle apparatus according to embodiment 1.

FIG. 1 is a block diagram illustrating an example of the configuration of a refrigeration cycle apparatus 100 according to embodiment 1. As illustrated in FIG. 1, the refrigeration cycle apparatus 100 includes a compressor 1, a refrigerant flow switching device 2, a heat-source-side heat exchanger 3, a pressure-reducing device 4, a use-side heat exchanger 5, and an accumulator 6. In the refrigeration cycle apparatus 100, the above devices are successively connected by refrigerant pipes, thereby providing a refrigeration cycle in which refrigerant circulates. The refrigeration cycle apparatus 100 is applied to, for example, air-conditioning apparatuses, refrigeration apparatuses, heat pump water heaters, etc.

Also, the refrigeration cycle apparatus 100 is provided with a controller 20 which control operations of various devices. The heat-source-side heat exchanger 3 is provided with a heat-source-side fan 7 which sends a fluid such as air to the heat-source-side heat exchanger 3. The use-side heat exchanger 5 is provided with a use-side fan 8 which sends a fluid such as air to the heat-source-side heat exchanger 3.

Furthermore, a heat source side filter 9 which removes foreign matter or the like from the fluid sent to the heat-source-side heat exchanger 3 by the heat-source-side fan 7 is provided between the heat-source-side heat exchanger 3 and the heat-source-side fan 7. A use-side filter 10 which removes foreign matter or the like from the fluid sent to the use-side heat exchanger 5 by the use-side fan 8 is provided between the use-side heat exchanger 5 and the use-side fan 8.

The compressor 1 sucks low-temperature, low-pressure refrigerant, compresses the refrigerant to make it to be in a high-temperature, high-pressure state, and then discharges it. The compressor 1 is, for example, an inverter compressor or the like which can control, for example, a compressor frequency to control the capacity.

The refrigerant flow switching device 2 is, for example, a four-way valve, and switches the operation to be performed between a cooling operation and a heating operation by switching a flowing direction of refrigerant.

The heat-source-side heat exchanger 3 causes heat exchange to be performed between refrigerant and the fluid such as air sent by the heat-source-side fan 7. Thereby, heating air or cooling air to be sent to an indoor space is generated. To be more specific, during the cooling operation, the heat-source-side heat exchanger 3 functions as an evaporator which evaporates refrigerant and cools air or the like with evaporation heat which results from the evaporation of the refrigerant. During the heating operation, the heat-source-side heat exchanger 3 functions as a condenser which heats air or the like with heat of the refrigerant.

The heat-source-side fan 7 sends a sucked fluid such as air to the heat-source-side heat exchanger 3 through the heat source side filter 9. The heat-source-side fan 7 is driven by a fan motor 7a, and can change the flow rate of the fluid to be sent to the heat-source-side heat exchanger 3. The following description is made by referring to by way of example the case where the fluid to be sent to the heat-source-side fan 7 is outdoor air.

The pressure-reducing device 4 adjusts the flow rate of refrigerant, thereby reducing the pressure of the refrigerant and expanding the refrigerant. The pressure-reducing device 4 is, for example, a valve the opening degree of which can be controlled, such as an electronic expansion valve. It should be noted that the pressure-reducing device 4 is not limited to this, and a capillary or another pressure-reducing device can also be applied.

The use-side heat exchanger 5 causes heat exchange to be performed between a fluid such as air sent by the use-side fan 8 and refrigerant. Thereby, the use-side heat exchanger 5 functions as a condenser during the cooling operation. Furthermore, during the heating operation, the use-side heat exchanger 5 functions as an evaporator.

The use-side fan 8 sends a sucked fluid such as air to the use-side heat exchanger 5 through the use-side filter 10. The use-side fan 8 is driven by a fan motor 8a, and can change the flow rate of the fluid to be sent to the use-side heat exchanger 5. It should be noted that the following description is made by referring to by way of example the case where the fluid to be sent to the use-side fan 8 is indoor air.

The accumulator 6 is provided on a suction side of the compressor 1. The accumulator 6 accumulates, for example, surplus refrigerant which generates because of the difference in operating state between the cooling operation and the heating operation, and surplus refrigerant which generates because of a transient change in the operation.

The controller 20 is made of software to be executed, for example, on an arithmetic unit such as a microcomputer or CPU (central processing unit), hardware such as a circuit device which fulfills various functions, or the like, and controls an operation of the entire refrigeration cycle apparatus 100. For example, based on an instruction regarding an operation which is given by a user, signals from various sensors to be described later or the like, the controller 20 controls the compressor frequency of the compressor 1, the opening degree of the pressure-reducing device 4 in the case where the pressure-reducing device 4 is an expansion valve, and the rotation speeds of the heat-source-side fan 7 and the use-side fan 8, etc.

Also, based on signals from various sensors, the controller 20, for example, determines whether abnormality occurs or not, classifies abnormalities, and determines where abnormality occurs. It should be noted that such processing regarding abnormality will be described later in detail.

The refrigeration cycle apparatus 100 is provided with pressure sensors 31 and 32, temperature sensors 33 to 38, and current sensors 39 and 40. The pressure sensor 31 is provided on a discharge side of the compressor 1, and detects a discharge pressure, which is the pressure of refrigerant discharged from the compressor 1. The pressure sensor 32 is provided on a suction side of the compressor 1, and detects a suction pressure, which is the pressure of refrigerant sucked into the compressor 1. The pressure sensors 31 and 32 output detection signals indicating results of the detection by these sensors to the controller 20.

The temperature sensors 33 to 36 are each provided to detect the temperature of the refrigerant in the refrigeration cycle either directly or indirectly via refrigerant pipes or the like, and output a detection signal indicating the result of the above detection to the controller 20.

The temperature sensor 33 is provided on the discharge side of the compressor 1, and detects the temperature of the refrigerant discharged from the compressor 1. The temperature sensor 34 is provided on a liquid-refrigerant side of the heat-source-side heat exchanger 3 which is a side for handing liquid refrigerant, detects the temperature of liquid refrigerant which flows from the heat-source-side heat exchanger 3 during the cooling operation, and detects the temperature of two-phase gas-liquid refrigerant which flows into the heat-source-side heat exchanger 3 during the heating operation.

The temperature sensor 35 is provided on a liquid-refrigerant side of the use-side heat exchanger 5, detects the temperature of two-phase gas-liquid refrigerant which flows into the use-side heat exchanger 5 during the cooling operation, and detects the temperature of liquid refrigerant which flows from the use-side heat exchanger 5 during the heating operation. The temperature sensor 36 is provided on a gas-refrigerant side of the use-side heat exchanger 5 which is a side for handling gas refrigerant, detects the temperature of gas refrigerant which flows from the use-side heat exchanger 5 during the cooling operation, and detects the temperature of gas refrigerant which flows into the use-side heat exchanger 5 during the heating operation.

Also, the temperature sensors 37 and 38 are provided to detect ambient temperature such as the temperature of outside air, and output detection signals indicating results of detection by these sensors to the controller 20. The temperature sensor 37 is provided at an air inlet of the heat-source-side heat exchanger 3, and detects the temperature of outside air. The temperature sensor 38 is provided at an air inlet of the use-side heat exchanger 5, and detects the temperature of indoor air.

The current sensor 39 detects an input current to the fan motor 7a, which drives the heat-source-side fan 7. The current sensor 40 detects an input current to the fan motor 8a, which drives the use-side fan 8. The current sensors 39 and 40 output detection signals indicating results of detection by these sensors to the controller 20.

[Configuration of Controller]

Figure 2:
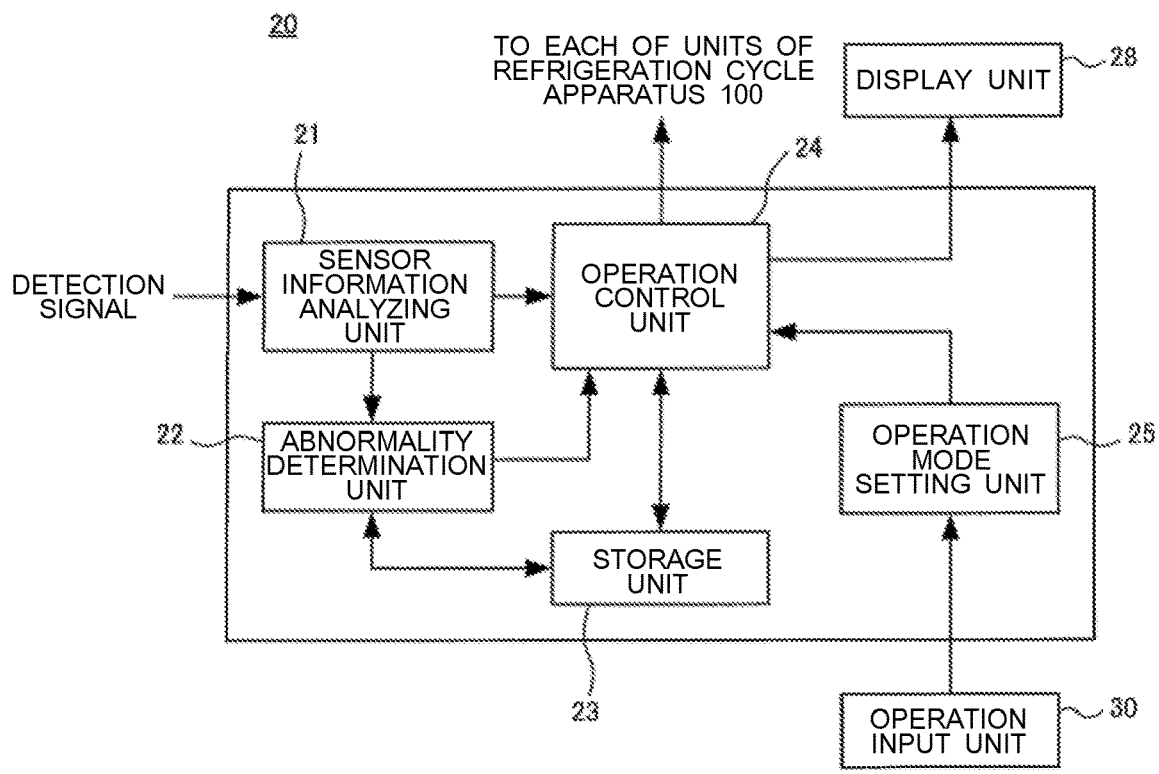
FIG. 2 is a block diagram illustrating an example of the configuration of a controller as illustrated in FIG. 1.

FIG. 2 is a block diagram illustrating an example of the configuration of the controller 20 as illustrated in FIG. 1. As illustrated in FIG. 2, the controller 20 includes a sensor information analysis unit 21, an abnormality determination unit 22, a storage unit 23, an operation control unit 24, and an operation mode setting unit 25. It should be noted that with respect to this example, only those parts of the controller 20 that are relevant to embodiment 1 are illustrated, and descriptions of the other parts of the controller will thus be omitted.

Also, the controller 20 is connected to an operation input unit 30 and a display unit 28. The operation input unit 30 is used by the user, for example, to select an operation mode. It should be noted that a detailed description of operation modes will be made later. The operation input unit 30 outputs an operation signal according to a user's operation, and supplies a signal indicating the selected operation mode to the operation mode setting unit 25, which will be described later in detail. As the operation input unit 30, for example, a remote control unit or the like can be used.

The display unit 28 is made of, for example, an LCD (liquid crystal display), an organic EL (electro luminescence) display, or the like, and displays information indicating whether abnormality occurs or not, and abnormality at a location specified as a location where the abnormality occurs, based on control by the operation control unit 24, which will be described later.

To the sensor information analysis unit 21, detection signals from various sensors are input, and based on the input detection signals, the sensor information analysis unit 21 obtains a parameter necessary for determining, in the case where abnormality occurs in the refrigeration cycle apparatus 100, where the abnormality occurs. The above parameter is, for example, the degree of superheat at the use-side heat exchanger 5, and will be described later in detail. The sensor information analysis unit 21 supplies the obtained parameter to the abnormality determination unit 22 and the operation control unit 24.

Based on the parameter from the sensor information analysis unit 21 and data stored in the storage unit 23 which will be described later, the abnormality determination unit 22 determines whether abnormality occurs or not. Also, when determining that abnormality occurs, the abnormality determination unit 22 determines where the abnormality occurs. Then, the abnormality determination unit 22 supplies information indicating whether abnormality occurs or not and information indicating where the abnormality occurs to the operation control unit 24.

The storage unit 23 stores therein various data including data which is necessary for components of the controller 20 at the time when the components perform various processes, and also stores, for example, data produced by the various processes. For example, the storage unit 23 stores therein parameter values, etc., which are used during a normal operation, and which are also used as reference values when the abnormality determination unit 22 determines where abnormality occurs in the case where the abnormality occurs. Also, for example, the storage unit 23 stores therein setting information which is necessary for causing the refrigeration cycle apparatus 100 to be operated in a specific operation mode to be described later. The specific operation mode will be described in detail later.

For example, in order to cause the refrigeration cycle apparatus 100 to operate in an operation mode which is selected by the user from a plurality of operation modes using the operation input unit 30, the operation mode setting unit 25 sets the selected operation mode as an operation mode in which the refrigeration cycle apparatus 100 will operate. The operation mode setting unit 25 supplies information indicating the selected operation mode to the operation control unit 24.

Based on the information, the operation control unit 24 controls the operation of each of components of the controller 20. Also, the operation control unit 24 controls the entire refrigeration cycle apparatus 100. For example, when receiving information indicating a specific operation mode for detecting abnormality, which is sent from the operation mode setting unit 25, the operation control unit 24 reads out setting information from the storage unit 23, and controls the operation of each of devices in the refrigeration cycle apparatus 100 based on the read setting information. Also, for example, if receiving information indicating where abnormality occurs in the case where the abnormality occurs, from the abnormality determination unit 22, the operation control unit 24 controls the operation of each of the devices in the refrigeration cycle apparatus 100 based on the received information.

[Air-Conditioning System]

The refrigeration cycle apparatus 100 according to embodiment 1 enables any of the operation modes to be selected by a remote operation, and can operate in the selected operation mode. Also, in the case where the refrigeration cycle apparatus 100 operates in the specific operation mode, it is possible to determine whether abnormality occurs or not in refrigeration cycle apparatus 100, and also determine where abnormality occurs in the case where it is detected that the abnormality occurs.

Figure 3:
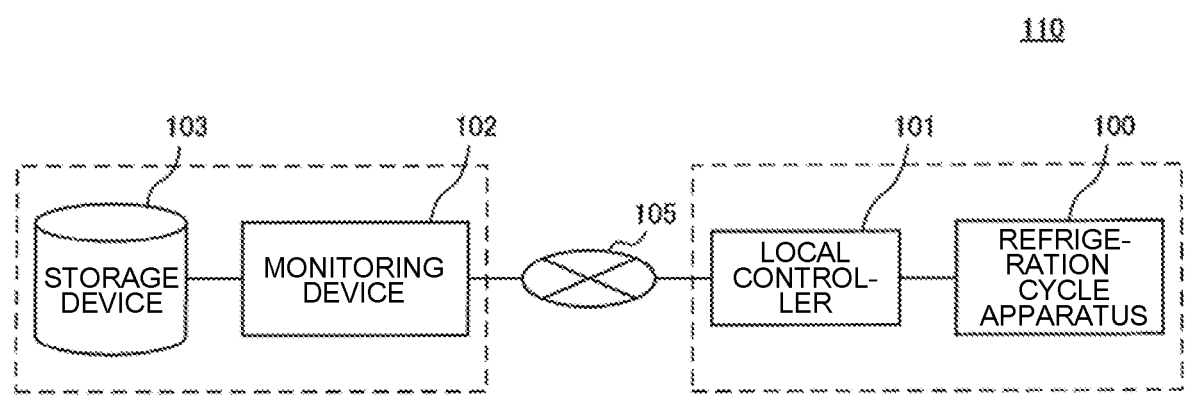
FIG. 3 is a block diagram illustrating an example of the configuration of a monitoring system 110 to which a refrigeration cycle apparatus 100 according to embodiment 1 is applicable.

FIG. 3 is a block diagram illustrating an example of the configuration of a monitoring system 110 to which the refrigeration cycle apparatus 100 according to embodiment 1 is applicable. As illustrated in FIG. 3, the monitoring system 110 is made up of the refrigeration cycle apparatus 100, a local controller 101, a monitoring device 102 and a storage device 103, and is connected to the local controller 101 and monitoring device 102 via a network 105 such as the Internet. Also, the monitoring device 102 and the storage device 103 are provided at a place which is remote from a place where the refrigeration cycle apparatus 100 and the local controller 101 are provided.

The refrigeration cycle apparatus 100 is obtained by omitting from the above configuration, the operation input unit 30, the display unit 28, the abnormality determination unit 22 in the controller 20, and the storage unit 23. Furthermore, the controller 20 in the refrigeration cycle apparatus 100 is provided with a communication unit not illustrated, and connected to the local controller 101 via the communication unit.

The local controller 101 is connected to the refrigeration cycle apparatus 100, and manages the refrigeration cycle apparatus 100. Also, to the local controller 101, the monitoring device 102 is connected via the network 105. The local controller 101 transmits and receives various data to and from the refrigeration cycle apparatus 100 and also transmits and receives various data to and from the monitoring device 102 via the network 105.

Figure 4:
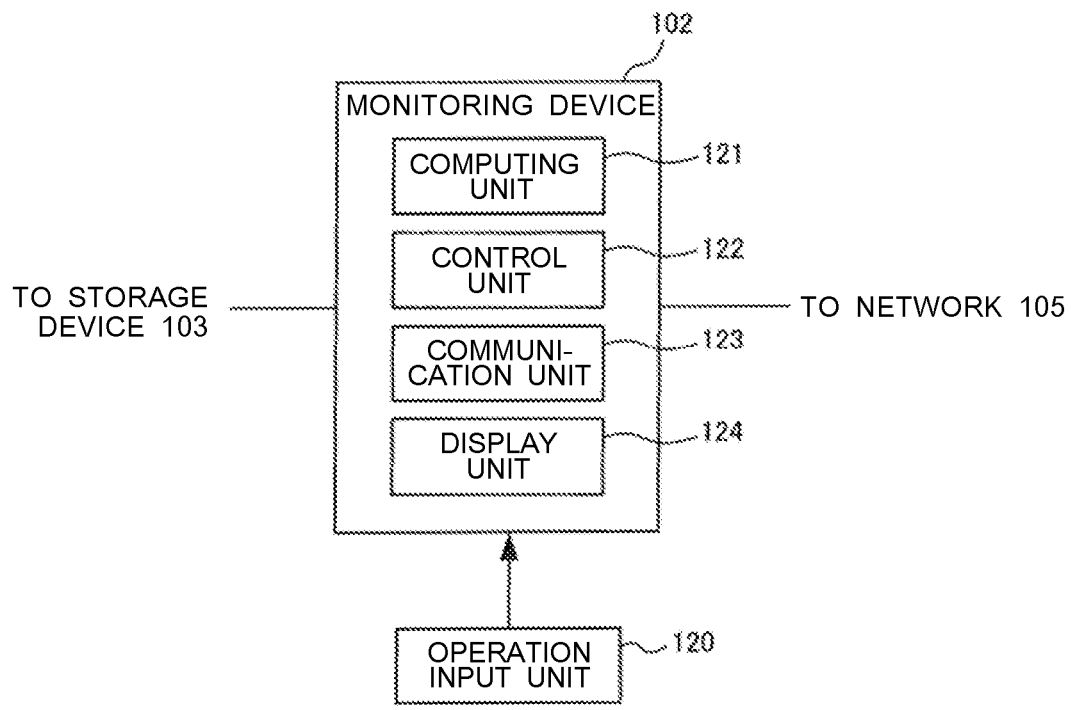
FIG. 4 is a block diagram illustrating an example of the configuration of a monitoring device as illustrated in FIG. 3.

FIG. 4 is a block diagram illustrating an example of the configuration of the monitoring device 102 as illustrated in FIG. 3. As illustrated in FIG. 4, the monitoring device 102 is made up of a computing unit 121, a control unit 122, a communication unit 123 and a display unit 124, and is connected to an operation input unit 120.

The operation input unit 120 is used, for example, by the user to select any of the operation modes, and corresponds to the operation input unit 30 described above The computing unit 121 corresponds to the abnormality determination unit 22 of the controller 20 in the refrigeration cycle apparatus 100 described above, and determines whether abnormality occurs or not, and also where abnormality occurs in the case where the abnormality occurs, etc., based on information received from the sensor information analysis unit 21 of the controller 20 via the communication unit 123, which will be described later.

The control unit 122 controls operations of various components of the monitoring device 102 based on input information. Also, the control unit 122 controls operations to be performed by the monitoring device 102, such as giving instructions to the local controller 101 connected via the network 105, setting the operation mode, and determining whether abnormality occurs.

The communication unit 123 transmits and receives various data to and from the local controller 101 connected via the network 105. Also, the communication unit 123 transmits and receives various data to and from a communication unit 131 of the storage device 103, which will be described later.

The display unit 124 is made of, for example, an LCD or an organic EL display, and displays information indicating whether abnormality occurs or not, and also indicating where the abnormality occurs, under control by the operation control unit 122. The display unit 124 corresponds to the display unit 28 described above.

Figure 5:
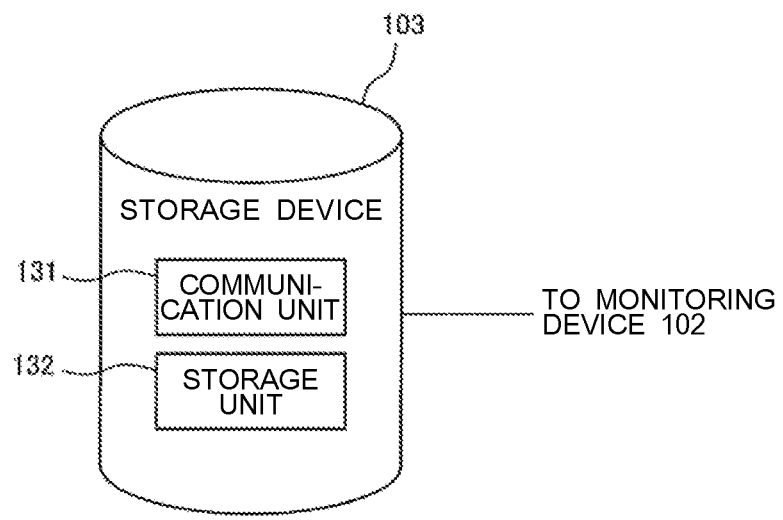
FIG. 5 is a block diagram illustrating an example of the configuration of a storage device as illustrated in FIG. 3.

FIG. 5 is a block diagram illustrating an example of the configuration of the storage device 103 as illustrated in FIG. 3. As illustrated in FIG. 5, the storage device 103 includes the communication unit 131 and a storage unit 132. The communication unit 131 transmits and receives various data to and from the communication unit 123 of the monitoring device 102. The storage unit 132 stores therein data received from the monitoring device 102 via the communication unit 131. The storage unit 132 corresponds to the storage unit 23 described above.

In such a manner, by applying the refrigeration cycle apparatus 100 to the monitoring system 110, various operations of the refrigeration cycle apparatus 100 can be controlled using the monitoring device 102 provided at a remote site.

[Operation of Refrigeration Cycle Apparatus]

Next, the states of refrigerant in a cooling operation mode and a heating operation mode of the refrigeration cycle apparatus 100 having the above configuration will be described. It should be noted that in the example as illustrated in FIG. 1, a state of the refrigerant flow switching device 2 which is indicated by a solid line corresponds to the state in the cooling operation mode, and a state of the refrigerant flow switching device 2 which is indicated by a dotted line corresponds to the state in the heating operation mode.

(Cooling Operation Mode)

First, the state of refrigerant in the cooling operation mode will be described. In the cooling operation mode, the state of the refrigerant flow switching device 2 is switched to the state indicated by the solid line in FIG. 1. Then, the low-temperature, low-pressure refrigerant is compressed by the compressor 1 into high-temperature, high-pressure gas refrigerant, and the high-temperature, high-pressure gas refrigerant is discharged.

The high-temperature, high-pressure gas refrigerant discharged from the compressor 1 flows into the heat-source-side heat exchanger 3 through the refrigerant flow switching device 2. In the heat-source-side heat exchanger 3, the high-temperature, high-pressure gas refrigerant condenses while transferring heat by exchanging heat with outdoor air, thereby changing into high-pressure liquid refrigerant which is in a subcooled state, and the high-pressure liquid refrigerant flows from the heat-source-side heat exchanger 3.

After flowing from the heat-source-side heat exchanger 3, the high-pressure liquid is decompressed by the pressure-reducing device 4 into low-temperature, low-pressure two-phase gas-liquid refrigerant, and flows into the use-side heat exchanger 5 as the low-temperature, low-pressure two-phase gas-liquid refrigerant. In the use-side heat exchanger 5, the low-temperature, low-pressure two-phase gas-liquid refrigerant receives heat and evaporates by exchanging heat with indoor air, thereby cooling the indoor air and changing into low-temperature, low-pressure gas refrigerant, and then flows from the use-side heat exchanger 5 as the low-temperature, low-pressure gas refrigerant.

After flowing from the use-side heat exchanger 5, the low-temperature, low-pressure gas refrigerant passes through the refrigerant flow switching device 2 and accumulator 6, and is sucked into the compressor 1.

(Heating Operation Mode)

Next, the state of refrigerant in the heating operation mode will be described. In the heating operation mode, the state of the refrigerant flow switching device 2 is switched to the state indicated by the dotted line in FIG. 1. Then, the low-temperature, low-pressure refrigerant is compressed by the compressor 1 into high-temperature, high-pressure gas refrigerant, and is discharged as the high-temperature, high-pressure gas refrigerant.

After discharged from the compressor 1, the high-temperature, high-pressure gas refrigerant flows into the use-side heat exchanger 5 through the refrigerant flow switching device 2. In the use-side heat exchanger 5, the high-temperature, high-pressure gas refrigerant condenses while transferring heat by exchanging heat with indoor air, thereby changing into high-pressure liquid refrigerant which is in a subcooled state, and the high-pressure liquid refrigerant then flows from the use-side heat exchanger 5.

After flowing from the use-side heat exchanger 5, the high-pressure liquid refrigerant is decompressed by the pressure-reducing device 4 into low-temperature, low-pressure two-phase gas-liquid refrigerant, and then flows into the heat-source-side heat exchanger 3 as the low-temperature, low-pressure two-phase gas-liquid refrigerant. In the heat-source-side heat exchanger 3, the low-temperature, low-pressure two-phase gas-liquid refrigerant receives heat and evaporates by exchanging heat with outdoor air, thereby changing into low-temperature, low-pressure gas refrigerant, and then flows from the heat-source-side heat exchanger 3 as the low-temperature, low-pressure gas refrigerant.

After flowing from the heat-source-side heat exchanger 3, the low-temperature, low-pressure gas refrigerant passes through the refrigerant flow switching device 2 and the accumulator 6, and is sucked into the compressor.

(Specific Operation Mode)

In the refrigeration cycle apparatus 100 according to embodiment 1, a specific operation mode for detecting whether abnormality in devices, etc., is provided. In the specific operation mode, for example, the cooling operation or the heating operation is performed, and a set temperature of indoor air is fixed. Then, it is possible to determine whether abnormality occurs based on output values of sensors which are obtained when the operating state of a device which is controlled by the controller 20 is changed from a first state to a second state. It should be noted that in the following description, such a device or devices as to be controlled by the controller 20 will be referred to as "element device" or "element devices" as appropriate.

(Classification of Abnormality in Location)

In embodiment 1, in the case where abnormality occurs in the refrigeration cycle apparatus, it is classified as abnormality of any of various kinds of sensors or abnormality of any of components forming the refrigeration cycle.

Such classification of abnormality can be made through estimation based on states of output values of the various sensors which are obtained in the case where the operating state of an element device is changed from the first state to the second state. Specifically, for example, if the output values of the various sensors are not changed when the operating states of the element devices are changed, it can be assumed that abnormality occurs in degradation of a sensor or sensors or disconnection thereof.

(Determination of where Abnormality Occurs)

In embodiment 1, in the specific operation mode, the operating state of one of element devices is changed, and the operating states of the other devices are fixed, whereby it is possible to detect whether abnormality occurs, and determine in which device the abnormality occurs. In this case, the element devices of the refrigeration cycle apparatus 100 are, for example, the compressor 1, the pressure-reducing device 4 serving as an expansion valve, the heat-source-side fan 7 and the use-side fan 8.

For example, in the case where the operating state of the compressor 1 is changed, the compressor frequency is changed. By changing the compressor frequency, it is possible to detect whether abnormality occurs in, for example, the pressure-reducing device 4 which serves as an expansion valve. Also, for example, in the case where the operating state of the pressure-reducing device 4 serving as an expansion valve is changed, the valve opening degree is changed. By changing the valve opening degree of the pressure-reducing device 4, it is possible to detect whether abnormality occurs in, for example, the compressor 1.

Furthermore, for example, to change the operating state of the heat-source-side fan 7 or use-side fan 8, the rotation speed of the fan is changed. By changing the rotation speed of the heat-source-side fan 7, it is possible to detect whether abnormality occurs, for example, in the heat-source-side fan 7 or heat-source-side heat exchanger 3. Also, by changing the rotation speed of the use-side fan 8, it is possible to detect whether abnormality occurs, for example, in the use-side fan 8 or the use-side heat exchanger 5.

(Case of Changing Compressor Frequency of Compressor)

Next, it will be specifically described how it is determined where abnormality occurs in the case where the abnormality occurs, in the specific operation mode. By changing the compressor frequency of the compressor 1, it is possible to detect whether, for example, a valve of the pressure-reducing device 4 is not normally operated, with respect to whether abnormality occurs.

The following example is described by referring to the case where the pressure-reducing device 4 is an expansion valve the opening degree of which is adjusted to expand refrigerant. Also, it is assumed that the valve opening degree of the pressure-reducing device 4 is controlled by the controller 20 such that the degree of superheat at the use-side heat exchanger 5 during the cooling operation reaches a preset temperature, for example, 4 degrees C.

Figure 6:
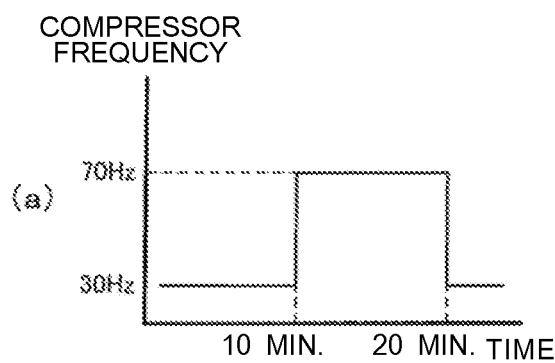
FIG. 6 contains graphs indicating examples of states of various parameters in the case where a compressor frequency of a compressor as illustrated in FIG. 1 is changed.
Figure 6:
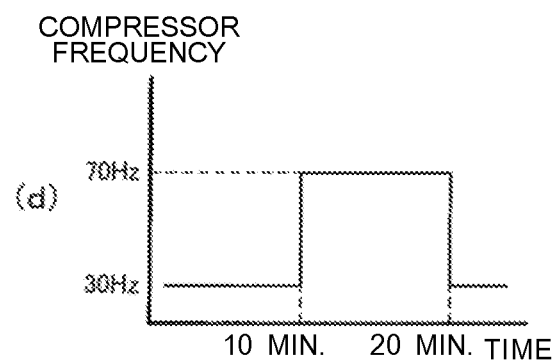
Figure 6:
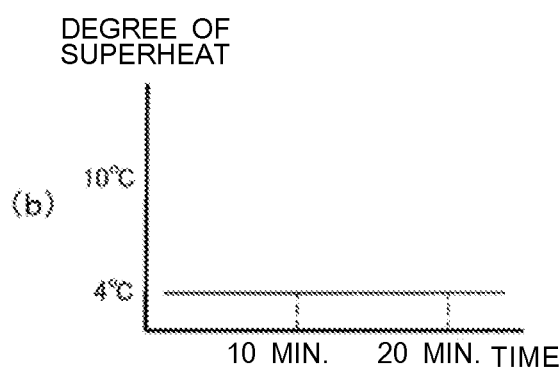
Figure 6:
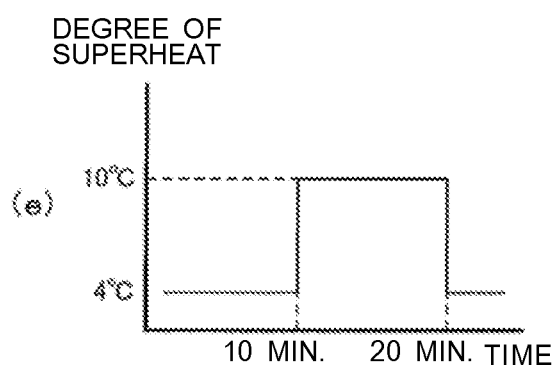
Figure 6:
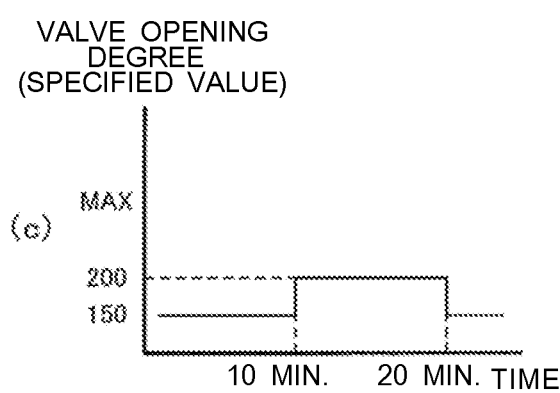
Figure 6:
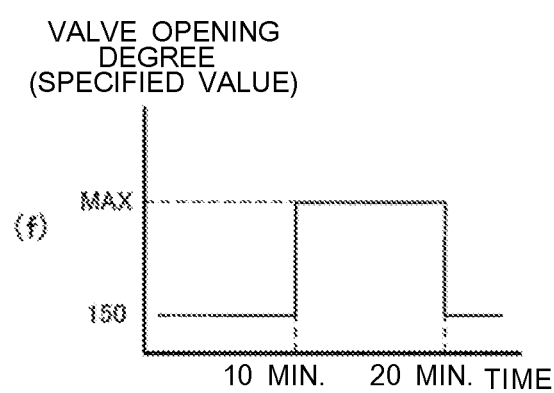

FIG. 6 contains graphs illustrating examples of states of various parameters in the case where the compressor frequency of the compressor 1 as illustrated in FIG. 1 is changed. That is, FIG. 6, (a) to (c), indicate states of the various parameters in the case where the refrigeration cycle apparatus 100 is normally operated.

FIG. 6, (a), indicates the state of the compressor frequency of the compressor 1, which is set in the specific operation mode. In this example, it is assumed that the compressor frequency of the compressor 1 is changed between 30 Hz and 70 Hz at intervals of, for example, 10 minutes. FIG. 6, (b), indicates the degree of superheat at the use-side heat exchanger 5 in the case where the compressor frequency of the compressor 1 is changed as indicated in (a) in FIG. 6. FIG. 6, (c), indicates the state of a value specified by the controller 20 as the valve opening degree of the pressure-reducing device 4 in the case where the compressor frequency of the compressor 1 is changed as indicated in (a) in FIG. 6.

FIG. 6, (d) to (f), indicate states of the parameters in the case where the refrigeration cycle apparatus 100 is not normally operated because of abnormality occurring in the pressure-reducing device 4.

FIG. 6, (d), as well as (a), indicates the state of the compressor frequency of the compressor 1 which is set in the specific operation mode. FIG. 6, (e), indicates the state of the degree of superheat at the use-side heat exchanger 5 in the case where the compressor frequency of the compressor 1 is changed as indicated in (d) in FIG. 6. FIG. 6, (f), indicates the state of a value indicated by the controller 20 as the valve opening degree of the pressure-reducing device 4 in the case where the compressor frequency of the compressor 1 is changed as indicated in (d) in FIG. 6.

In the case where the refrigeration cycle apparatus 100 is operated normally, if the compressor frequency of the compressor 1 is changed as indicated in (a) in FIG. 6, the controller 20 controls the valve opening degree of the pressure-reducing device 4 such that the degree of superheat at the use-side heat exchanger 5 is kept at 4 degrees C.

In the case where the compressor frequency of the compressor 1 is increased, with the degree of superheat controlled to be kept at a certain temperature, it is necessary to increase the valve opening degree of the pressure-reducing device 4. Therefore, as indicated in (c) in illustrated in FIG. 6, the controller 20 controls the pressure-reducing device 4 to increase the valve opening degree of the pressure-reducing device 4 at timing when the compressor frequency is increased. As a result, the degree of superheat is kept at 4 degrees C. as indicated in (b) in FIG. 6.

It should be noted that the degree of superheat at the use-side heat exchanger 5 can be calculated by subtracting a saturation temperature at a pressure detected by the pressure sensor 32 from a temperature detected by the temperature sensor 36.

By contrast, in the case where abnormality occurs in the refrigeration cycle apparatus 100, when the compressor frequency of the compressor 1 is changed as indicated in (d) in FIG. 6, the controller 20 controls the valve opening degree of the pressure-reducing device 4 such that the degree of superheat is kept at 4 degrees C. However, in this example, the valve of the pressure-reducing device 4 is not normally operated, and as a result the degree of superheat increases to 10 degrees C. Therefore, the controller 20 controls the valve opening degree to be further increased. As a result, the value specified by the controller 20 as the valve opening degree is eventually maximized.

In such a manner, in the case where abnormality occurs in the refrigeration cycle apparatus 100 and is caused by the pressure-reducing device 4, the state of the degree of superheat at the use-side heat exchanger 5 and the value specified by the controller 20 as the valve opening degree of the pressure-reducing device 4 differ from those in the case where the refrigeration cycle apparatus 100 is normally operated.

Thus, if abnormality occurs in the refrigeration cycle apparatus 100, in the case where the specific operation mode is set, and the state of the degree of superheat and the value specified as the valve opening degree differ from those in the case where the operation is normally performed, it can be determined whether abnormality occurs in the pressure-reducing device 4.

It should be noted that during the heating operation, by checking the state of the degree of superheat at the heat-source-side heat exchanger 3 and the value specified as the valve opening degree of the pressure-reducing device 4, with the degree of superheat at the heat-source-side heat exchanger 3 kept constant, it is also possible to detect whether abnormality occurs in the pressure-reducing device 4.

Although in this example, it is determined whether abnormality occurs in the pressure-reducing device 4 based on the degree of superheat at the use-side heat exchanger 5 and the value specified as the valve opening degree of the pressure-reducing device 4, this is not restrictive. For example, in embodiment 1, it is also possible to detect whether abnormality occurs in the pressure-reducing device 4 only based on the value specified as the valve opening degree of the pressure-reducing device 4. This is because in the case where abnormality occurs in the pressure-reducing device 4, for example, if the value specified as the valve opening degree of the pressure-reducing device 4 is increased, the degree of superheat at the use-side heat exchanger 5 is also increased accordingly; that is, the degree of superheat varies in accordance with the variation of the value specified as the valve opening degree.

(Case of Changing Rotation Speed of Fan)

Next, it will be described how to detect whether abnormality occurs by changing the rotation speed of the use-side fan 8. By changing the rotation speed of the use-side fan 8, it is possible to detect whether abnormality occurs in, for example, the fan motor 8a which drives the use-side fan 8, the use-side filter 10 between the use-side heat exchanger 5 and use-side fan 8, and the use-side heat exchanger 5.

It should be noted that the following example is described by referring to the case where the refrigeration cycle apparatus 100 is operated in the cooling mode. That is, in the following description, it is assumed that the use-side heat exchanger 5 functions as an evaporation. Also, in the example, it is assumed that the valve opening degree of the pressure-reducing device 4 is controlled by the controller 20 such that the degree of superheat at the use-side heat exchanger 5 during the cooling operation is set to 4 degrees C.

(During Normal Operation)

Figure 7:
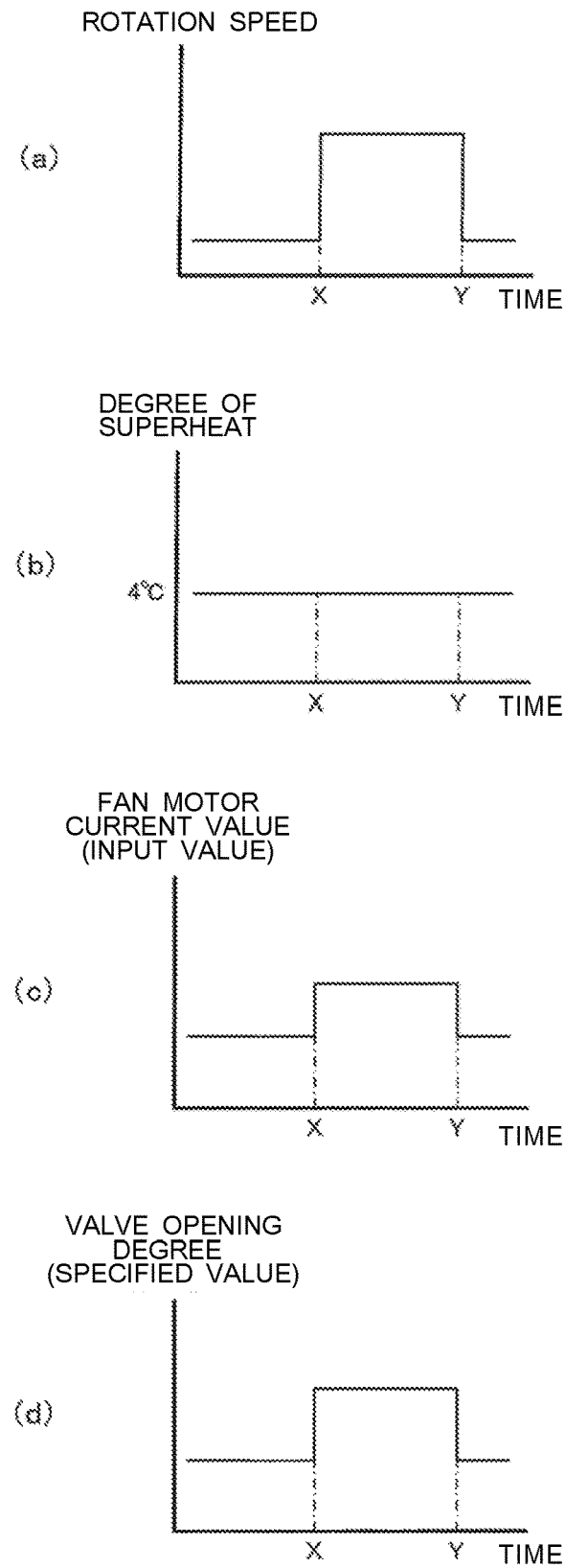
FIG. 7 contains graphs indicating examples of states of various parameters in the case where the refrigeration cycle apparatus as illustrated in FIG. 1 is normally operated and a rotation speed of a use-side fan is changed.

The following description is made with respect to the case where the refrigeration cycle apparatus 100 is normally operated. FIG. 7 contains schematic diagrams illustrating examples of states of various parameters in the case where the refrigeration cycle apparatus 100 as illustrated in FIG. 1 is normally operated and the rotation speed of the use-side fan 8 is changed.

FIG. 7, (a), indicates the state of the rotation speed of the use-side fan 8 set in the specific operation mode. In this example, it is assumed that the rotation speed of the use-side fan 8 is increased at time X and returned to the original rotation speed at time Y. FIG. 7, (b), indicates the state of the degree of superheat at the use-side heat exchanger 5 in the case where the rotation speed of the use-side fan 8 is changed as illustrated in (a) in FIG. 7. FIG. 7, (c), indicates the state of a current value input to the fan motor 8a of the use-side fan 8 in the case where the rotation speed of the use-side fan 8 is changed as indicated in (a) in FIG. 7. FIG. 7, (d), indicates the state of the value specified by the controller 20 as the valve opening degree of the pressure-reducing device 4 in the case where the rotation speed of the use-side fan 8 is changed as indicated in (a) in FIG. 7.

In the case where the refrigeration cycle apparatus 100 is normally operated, the controller 20 controls the use-side fan 8 to change the fan rotation speed as indicated in (a) in FIG. 7, and at the same time, controls the valve opening degree of the pressure-reducing device 4 such that the degree of superheat at the use-side heat exchanger 5 is kept at a preset temperature.

As illustrated in (d) in FIG. 7, the controller 20 controls the pressure-reducing device 4 to increase the valve opening degree of the pressure-reducing device 4 at time X at which the fan rotation speed increases. As a result, the degree of superheat at the use-side heat exchanger 5 is kept at a set temperature as indicated in (b) in FIG. 7.

In the above case, the current value input to the fan motor 8a varies in accordance with the fan rotation speed as indicated in (c) in FIG. 7. To be more specific, the current value of the fan motor 8a increases as the fan rotation speed increases, and decreases as the fan rotation speed decreases.

(Case where Abnormality Occurs in Fan Motor)

Next, the following description is made with respect to case where the refrigeration cycle apparatus 100 is not normally operated because of abnormality occurring in the fan motor 8a of the use-side fan 8. In this example, it is assumed that the fan motor 8a has abnormality, and especially deteriorates, and thus cannot enable the fan to send air at an expected flow rate.

Figure 8:
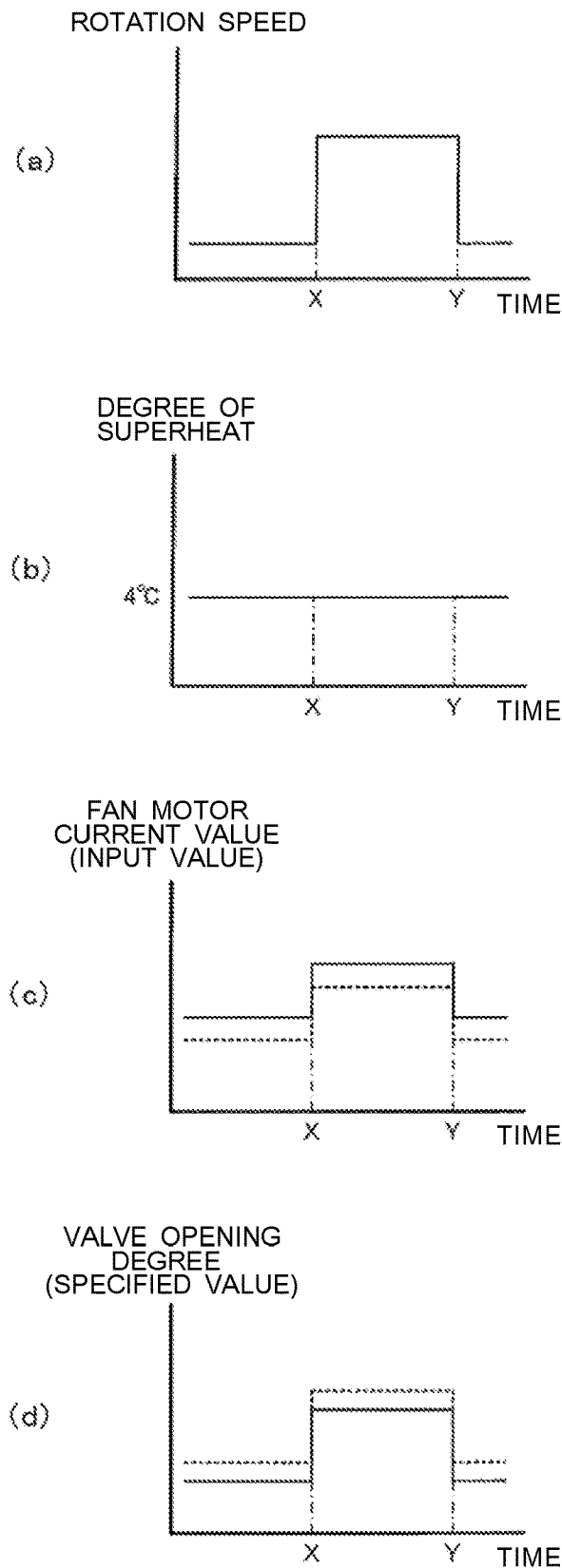
FIG. 8 contains graphs indicating first examples of states of various parameters in the case where the refrigeration cycle apparatus as illustrated in FIG. 1 is not normally operated and the rotation speed of the use-side fan is changed.

FIG. 8 contains graphs indicating a first example of states of various parameters in the case where the refrigeration cycle apparatus 100 as illustrated in FIG. 1 is not normally operated and the rotation speed of the use-side fan 8 is changed. FIG. 8, (a), indicates the state of the rotation speed of the use-side fan 8 which is set in the specific operation mode. In this example, as in the example as indicated in (a), FIG. 7, it is assumed that the rotation speed of the use-side fan 8 is increased at time X and returned to the original rotation speed at time Y.

FIG. 8, (b), indicates the state of the degree of superheat at the use-side heat exchanger 5 in the case where the rotation speed of the use-side fan 8 is changed as indicated in (a) in FIG. 8. FIG. 8, (c), indicates the state of a current value input to the fan motor 8a of the use-side fan 8 in the case where the rotation speed of the use-side fan 8 is changed as indicated in (a) in FIG. 8. FIG. 8, (d), indicates the state of the value indicated by the controller 20 as the valve opening degree of the pressure-reducing device 4 in the case where the rotation speed of the use-side fan 8 is changed as indicated in (a) in FIG. 8, and the value of the valve opening degree is specified by the controller 20. In should be noted that in each of FIG. 8, (c) to (d), the state indicated by a dotted line corresponds to the state in the case where the refrigeration cycle apparatus 100 is normally operated.

In the case where the refrigeration cycle apparatus 100 is not normally operated, first, the controller 20 controls the use-side fan 8 to change the rotation speed as indicated in (a) in FIG. 8. In this case, since the fan motor 8a of the use-side fan 8 is deteriorated, the current value input to the fan motor 8a is greater than that during the normal operation, as indicated in (c) in FIG. 8, in order that the fan rotation speed be set to an expected fan rotation speed.

Also, the controller 20 controls the valve opening degree of the pressure-reducing device 4 such that the degree of superheat at the use-side heat exchanger 5 is kept at a preset temperature. In this case, the degree of superheat at the use-side heat exchanger 5 is kept at a set temperature as indicated in (b) in FIG. 8, but air cannot be sent to the use-side heat exchanger 5 at an expected flow rate because of deterioration of the fan motor 8a, and thus the degree of superheat tends to lower. Therefore, as indicated in (d) in FIG. 8, the controller 20 controls the pressure-reducing device 4 such that the valve opening degree of the pressure-reducing device 4 is smaller than that during the normal operation.

In such a manner, in the case where abnormality occurs in the refrigeration cycle apparatus 100 and is caused by the fan motor 8a of the use-side fan 8, the state of input current value to the fan motor 8a of the use-side fan 8 and the value specified by the controller 20 as the value opening degree of the pressure-reducing device 4 differ from those in the case where the refrigeration cycle apparatus 100 is normally operated.

Therefore, when abnormality occurs in the refrigeration cycle apparatus 100, in the case where the specific operation mode is set, the fan rotation speed of the use-side fan 8 is changed, and the state of the input current value to the fan motor 8a and the value specified as the valve opening degree differ from those in the case where the refrigeration cycle apparatus 100 is normally operated, it can be determined that abnormality occurs in the fan motor 8a.

(Case where Abnormality Occurs in Filter)

The following description is made with respect to the case where the refrigeration cycle apparatus 100 is not normally operated because of abnormality occurring in a filter. In this example, it is assumed that abnormality occurs in the use-side filter 10 between the use-side heat exchanger 5 and the use-side fan 8, and especially clogging occurs in the use-side filter 10, and when the set flow rate of the use-side fan 8 is a maximum flow rate, the use-side fan 8 cannot send air at the maximum flow rate, that is, it cannot send air at an expected flow rate.

Figure 9:
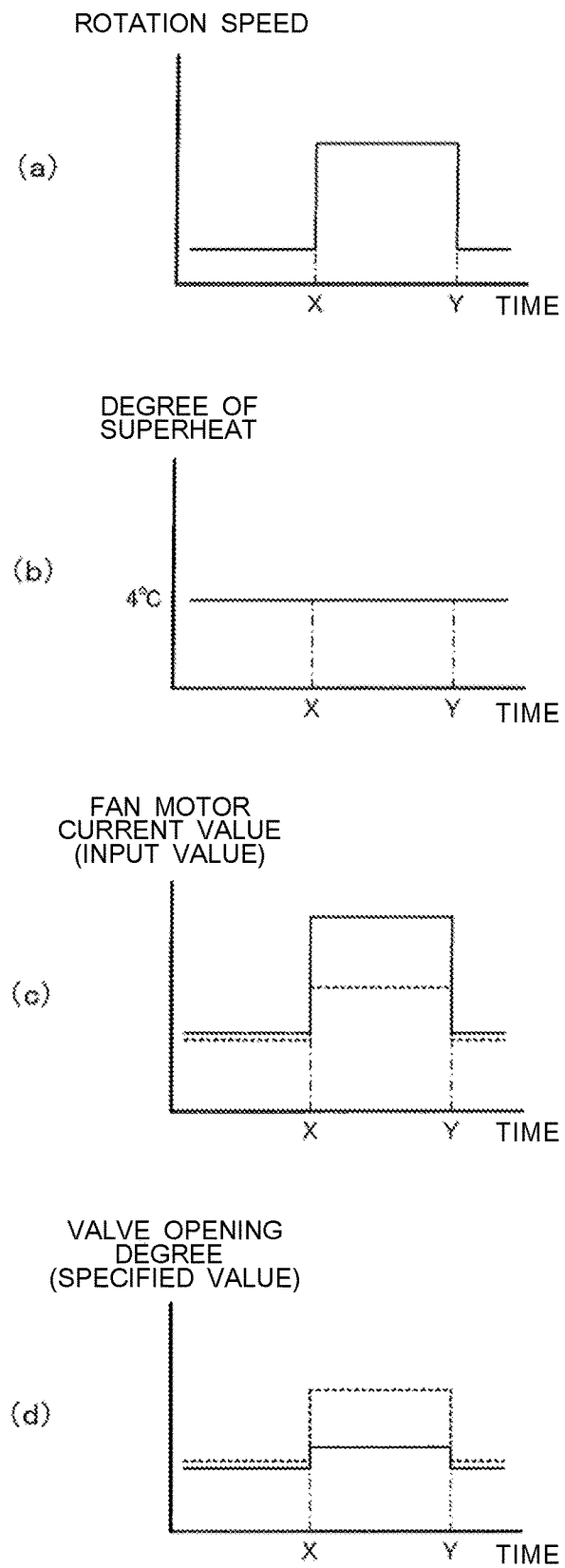
FIG. 9 contains graphs indicating second examples of states of various parameters in the case where the refrigeration cycle apparatus as illustrated in FIG. 1 is not normally operated and the rotation speed of the use-side fan is changed.

FIG. 9 contains graphs illustrating a second example of states of various parameters in the case where the refrigeration cycle apparatus 100 as illustrated in FIG. 1 is not normally operated and the rotation speed of the use-side fan 8 is changed. FIG. 9, (a), indicates the state of the rotation speed of the use-side fan 8 which is set in the specific operation mode. In this example, as in the examples indicated in (a) in FIG. 7 and (a) in FIG. 8, it is assumed that the rotation speed of the use-side fan 8 is increased at time X and returned to the original rotation speed at time Y.

FIG. 9, (b), indicates the state of the degree of superheat at the use-side heat exchanger 5 in the case where the rotation speed of the use-side fan 8 is changed as indicated in (a) in FIG. 9. FIG. 9, (c), indicates the state of the current value input to the fan motor 8a to drive the use-side fan 8 in the case where the fan rotation speed of the use-side fan 8 is changed as illustrated (a) in FIG. 9. FIG. 9, (d), indicates the state of the value specified by the controller 20 as the valve opening degree of the pressure-reducing device 4 in the case where the rotation speed of the use-side fan 8 is changed as indicated in (a) in FIG. 9. It should be noted that in each of FIG. 9, (c) and (d), a dotted line indicates the state in which the refrigeration cycle apparatus 100 is normally operated.

In the case where the refrigeration cycle apparatus 100 is not normally operated, first, the controller 20 controls the use-side fan 8 to change the rotation speed as indicated in (a) in FIG. 9. In this case, since the use-side filter 10 between the use-side heat exchanger 5 and use-side fan 8 is clogged, in the case where the fan rotation speed is high, air hardly passes through the use-side filter 10, and thus a sufficiently amount of air cannot be supplied to the use-side heat exchanger 5. Consequently, air failing to pass through the use-side filter 10 acts as a resistance against the use-side fan 8, and a current value which is input to the fan motor 8a to achieve an expected fan rotation speed is greater than that in the case where the refrigeration cycle apparatus 100 is normally operated, as indicated in (c) in FIG. 9.

Furthermore, the controller 20 controls the valve opening degree of the pressure-reducing device 4 such that the degree of superheat at the use-side heat exchanger 5 is kept at a preset temperature. In this case, the degree of superheat at the use-side heat exchanger 5 is kept at a set temperature as indicated in (b) in FIG. 9; however, air cannot be sent to the use-side heat exchanger 5 at an expected flow rate because of clogging of the use-side filter 10, and the degree of superheat thus tends to lower. Therefore, as indicated in (d) in FIG. 9, the controller 20 controls the pressure-reducing device 4 to make the valve opening degree of the pressure-reducing device 4 smaller than that in the case where the refrigeration cycle apparatus 100 is normally operated.

In such a manner, in the case where abnormality occurs in the refrigeration cycle apparatus 100, and is caused by the use-side filter 10 between the use-side heat exchanger 5 and use-side fan 8, the state of the input current value to the fan motor 8a of the use-side fan 8 and the value specified by the controller as the valve opening degree of the pressure-reducing device 4 by the controller 20 differ from those in the case where the refrigeration cycle apparatus 100 is normally operated.

Therefore, when abnormality occurs in the refrigeration cycle apparatus 100, in the case where the specific operation mode is set, the rotation speed of the use-side fan 8 is changed, and the state of input current value to the fan motor 8a and the value specified as the valve opening degree differ from those in the case where the refrigeration cycle apparatus 100 is normally operated, it can be determined that abnormality occurs in the use-side filter 10.

It should be noted that in the case where abnormality occurs in the fan motor 8a and in the case where abnormality occurs in the use-side filter 10, it is determined where the abnormality occurs, by checking the state of the current value input to the fan motor 8*a* and the value specified as the valve opening degree. Therefore, in this case, there is a case where it cannot be reliably determined whether the abnormality occurs in the fan motor 8*a* or in the use-side filter 10.

However, the difference (see FIG. 9) between a current value which is input to the fan motor 8*a* in the case where abnormality occurs in the use-side filter 10 and a current value in the case where the refrigeration cycle apparatus 100 is normally operated is greater than the difference (see FIG. 8) between a current value which is input to the fan motor 8*a* in the case where the fan motor 8*a* is deteriorated and the current value in the case where the refrigeration cycle apparatus 100 is normally operated. This is because in the case where the use-side filter 10 is clogged, it is harder to increase the rotation speed of the use-side fan 8 than in the case where the fan motor 8*a* is deteriorated. The same is true of the relationship between the difference between the value specified as the valve opening degree in the case where abnormality occurs in the use-side filter 10 and the value specified as the valve opening degree in the case where the use-side filter 10 is normal and the difference between the value specified as the valve opening degree in the case where abnormality occurs in the fan motor 8*a* and the value specified as the valve opening degree in the case where the fan motor 8*a* is normal.

That is, in embodiment 1, it is possible to determine which of the fan motor 8*a* and use-side filter 10 causes abnormality based on the difference in each of parameters between a value in the case where abnormality occurs and that in the case where the abnormality does not occur, that is, the operation is normally performed.

(Case Wherein Abnormality Occurs in Heat Exchanger)

The following is made with respect to the case where the refrigeration cycle apparatus 100 is not normally operated because of abnormality occurring in the use-side heat exchanger 5. In this example, it is assumed that abnormally occurs in the use-side heat exchanger 5, and in particular, the heat exchanger is corroded, as a result of which exchange heat cannot be performed between refrigerant and indoor air.

Figure 10:
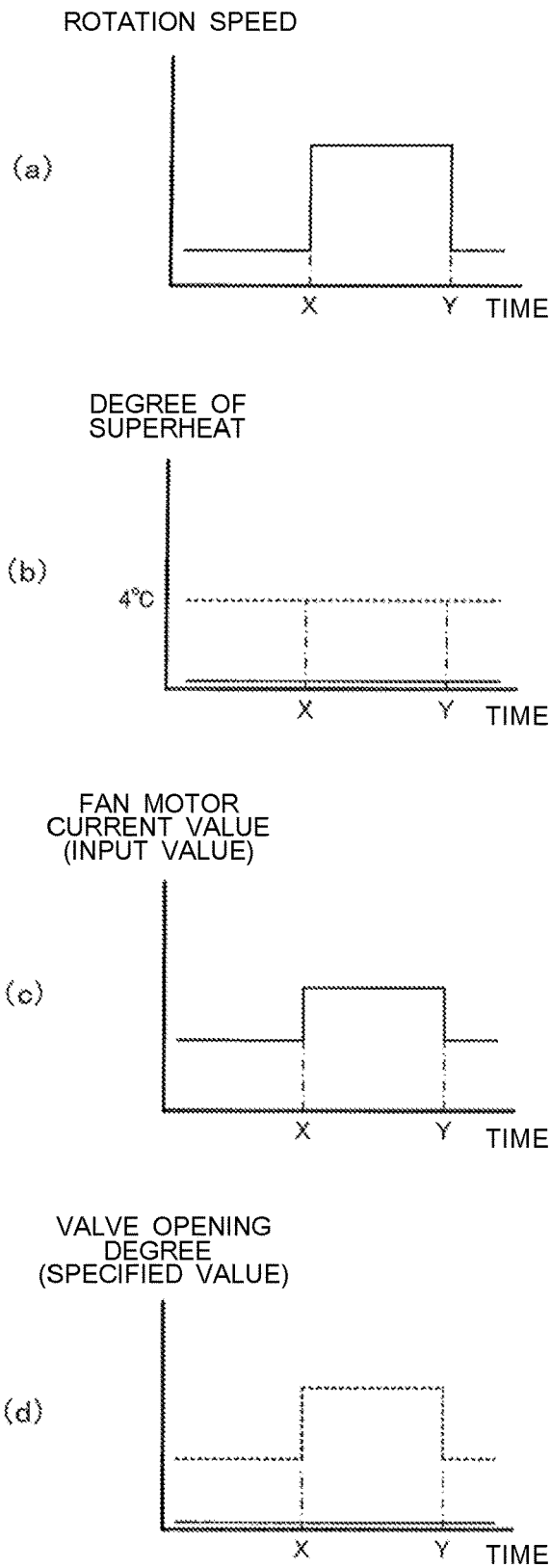
FIG. 10 contains graphs indicating third examples of states of various parameters in the case where the refrigeration cycle apparatus 100 as illustrated in FIG. 1 is not normally operated and the rotation speed of a use-side fan 8 is changed.

FIG. 10 contains graphs indicating a third example of states of various parameters in the case where the refrigeration cycle apparatus 100 as illustrated in FIG. 1 is not normally operated and the rotation speed of the use-side fan 8 is changed. FIG. 10, (a), indicates the state of the rotation speed of the use-side fan 8 which is set in the specific operation mode. In this example, as in the examples illustrated in (a) in FIG. 7, (a) in FIG. 8 and (a) in FIG. 9, it is assumed that the rotation speed of the use-side fan 8 is increased at time X, and returned to the original rotation speed at time Y.

FIG. 10, (b), indicates the state of the degree of superheat at the use-side heat exchanger 5 in the case where the rotation speed of the use-side fan 8 is changed as indicated in (a) in FIG. 10. FIG. 10, (c), indicates the state of the current value input to the fan motor 8*a* to drive the use-side fan 8 in the case where the rotation speed of the use-side fan 8 is changed as indicated in (a) in FIG. 10. FIG. 10, (d), indicates the state of the value indicated by the controller 20 as the valve opening degree of the pressure-reducing device 4 in the case where the fan rotation speed of the use-side fan 8 is changed as indicated in (a) in FIG. 10. It should be noted that in each of (b) to (d) in FIG. 10, a dotted line indicate the state in which the refrigeration cycle apparatus 100 is normally operated.

In the case where the refrigeration cycle apparatus 100 is not normally operated, first, the controller 20 controls the use-side fan 8 to change the rotation speed as indicated in (a) in FIG. 10. In this case, the current value input to the fan motor 8*a* is the same as that in the case where the operation is normally operated, as indicated in (c) in FIG. 10.

Also, the controller 20 controls the valve opening degree of the pressure-reducing device 4 such that the degree of superheat at the use-side heat exchanger 5 is kept at a preset temperature. In this case, however, since the use-side heat exchanger 5 cannot perform heat exchange, the degree of superheat at the use-side heat exchanger 5 is 0 degrees C. or approximately 0 degrees C. as indicated in (b) in FIG. 10. Therefore, as indicated in (d) in FIG. 10, the controller 20 controls the pressure-reducing device 4 to make the valve opening degree of the pressure-reducing device 4 smaller than that in the case where the operation is normally performed. In this case, since the degree of superheat is 0 degrees C. or approximately 0 degrees C., the controller 20 causes the valve opening degree of the pressure-reducing device 4 to be minimized.

In such a manner, in the case where abnormality occurs in the refrigeration cycle apparatus 100, and is caused by the use-side heat exchanger 5, the state of the degree of superheat at the use-side heat exchanger 5 and the value indicated by the controller 20 as the valve opening degree of the pressure-reducing device 4 differ from those in the case where the refrigeration cycle apparatus 100 is normally operated.

Therefore, when abnormality occurs in the refrigeration cycle apparatus 100, in the case where the specific operation mode is set, the rotation speed of the use-side fan 8 is changed, and the state of the degree of superheat and the value specified as the valve opening degree differ from those in the case where the refrigeration cycle apparatus 100 is normally operated, it can be determined that abnormality occurs in the use-side heat exchanger 5.

The above is also true of the case where the refrigeration cycle apparatus 100 performs the heating operation in the specific operation mode, and the rotation speed of the heat-source-side fan 7 is changed.

That is, it is possible to detect whether abnormality occurs in the fan motor 7*a* of the heat-source-side fan 7, the heat source side filter 9, and the heat-source-side heat exchanger 3, by checking the degree of superheat at the heat-source-side heat exchanger 3, the input current value to the fan motor 7*a*, and the value specified as the valve opening degree in the case where the rotation speed of the heat-source-side fan 7 is changed As described above, in the refrigeration cycle apparatus 100 according to embodiment 1, the compressor 1, the heat-source-side heat exchanger 3, the pressure-reducing device 4 and the use-side heat exchanger 5 are connected by pipes to allow refrigerant to circulate as a refrigeration cycle; the controller 20 which controls the operations of devices is provided; and the controller 20 causes the refrigeration cycle apparatus 100 to operate in the specific operation mode for determining where abnormality occurs, based on the states of the devices in the case where the operation state of one of a plurality of element devices which are included in a plurality of devices and which are controlled by the controller 20 is changed from a first state to a second state.

Therefore, since the state of each of the devices varies in accordance with whether the refrigeration cycle apparatus 100 is normally operated or not normally operated, it is possible to determine whether abnormality occurs or not. Furthermore, in the case where the operation state of a certain element device is changed, the changed state varies in accordance with which part of the device abnormality occurs in. It is therefore possible to determine whether abnormality occurs.

Embodiment 2

A refrigeration cycle apparatus according to embodiment 2 will be described.

In embodiment 1 described above, the heat-source-side heat exchanger 3 employed in the refrigeration cycle apparatus 100 is of an air-cooled type. With respect to embodiment 2, a refrigeration cycle apparatus employed a water-cooled type heat-source-side heat exchanger 3 will be described. For example, a water-cooled refrigeration cycle apparatus is a water-cooled chiller unit.

[Configuration of Refrigeration Cycle Apparatus]

Figure 11:
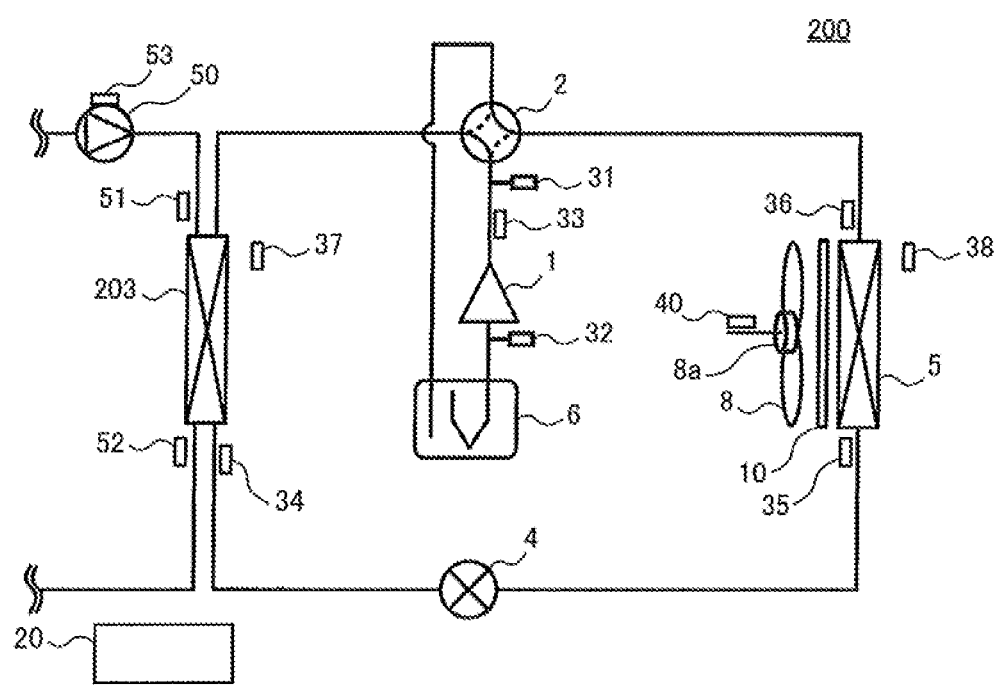
FIG. 11 is a block diagram illustrating an example of the configuration of a refrigeration cycle apparatus according to embodiment 2.

FIG. 11 is a block diagram illustrating an example of the configuration of a refrigeration cycle apparatus 200 according to embodiment 2. As illustrated in FIG. 11, the refrigeration cycle apparatus 200 includes a compressor 1, a refrigerant flow switching device 2, a heat-source-side heat exchanger 203, a pressure-reducing device 4, a use-side heat exchanger 5, an accumulator 6, and a water-cooled pump 50. In the refrigeration cycle apparatus 200, a refrigerating cycle is formed as in the refrigeration cycle apparatus 100 according to embodiment 1, and in addition the heat-source-side heat exchanger 203 and a water-cooled pump 50 are connected by a pipe, thereby forming a water-cooled circuit in which water or brine (hereinafter referred to as "cooling water" as appropriate) circulates. It should be noted that in the following description, components which are the same as or similar to those in embodiment 1 are denoted by the same reference numerals, and their descriptions will thus be omitted.

The heat-source-side heat exchanger 203 causes heat exchange to be performed between refrigerant which flows through the refrigeration cycle and cooling water which is circulated in the water-cooled circuit by the water-cooled pump 50. Thereby, heating air or cooling air to be supplied to the indoor space is generated.

The water-cooled pump 50 draws cooling water from a cooling tower not illustrated, and injects the drawn cooling water into the heat-source-side heat exchanger 203. The water-cooled pump 50 is configured to be able to adjust the flow rate of the cooling water, for example, with electric current. The water-cooled pump 50 is made of, for example, a DC pump 50 whose capacity can be controlled in accordance with an amount of current flowing through a motor not illustrated.

The refrigeration cycle apparatus 200 is provided with water temperature sensors 51 and 52 and a current sensor 53 in addition to the various sensors which are provided in the refrigeration cycle apparatus 100 as described above.

The temperature sensors 51 and 52 detect temperature of cooling water which flows in the water-cooled circuit either directly or indirectly via refrigerant pipes or the like, and output detection signals indicating the results of the detection to the controller 20. The temperature sensor 51 is provided on an inlet side of the water-cooled circuit in the heat-source-side heat exchanger 203, and detects the temperature of cooling water which flows into the heat-source-side heat exchanger 203. The temperature sensor 52 is provided on an outlet side of the water-cooled circuit in the heat-source-side heat exchanger 203, and detects the temperature of cooling water which flows from the heat-source-side heat exchanger 203.

The current sensor 53 detects an amount of current flowing through a motor not illustrated, which drives the water-cooled pump 50. The current sensor 53 can be made of, for example, a Hall device. The current sensor 53 outputs a detection signal indicating the result of the detection to the controller 20.

[Operation of Refrigeration Cycle Apparatus]

Operation of the refrigeration cycle apparatus 200 having the above configuration will be described. It should be noted that the operations of the refrigeration cycle apparatus 200 in the cooling operation mode and in the heating operation mode are the same as those of the refrigeration cycle apparatus 100 according to embodiment 1 described above, except that in the refrigeration cycle apparatus 200, in the heat-source-side heat exchanger 203, heat exchange is performed between refrigerant and cooling water.

In embodiment 2, element devices whose operating states are changed by the controller 20 in the specific operation mode for detecting abnormality are the compressor 1, the pressure-reducing device 4 and the water-cooled pump 50. By changing the operating state of one of these element devices as in embodiment 1 described above, and fixing the operating states of the other element devices, it is possible to detect whether abnormality occurs.

For example, to change the operating state of the water-cooled pump 50, the flow rate of the cooling water which flows from the water-cooled pump 50 is changed. By changing the flow rate of the cooling water flowing from the water-cooled pump 50, it is possible to detect whether abnormality occurs in the water-cooled pump 50, the heat-source-side heat exchanger 203, etc., as in the case of changing the rotation speed of the heat-source-side fan 7 as in embodiment 1.

That is, when the flow rate of the cooling water from the water-cooled pump 50 is changed, by checking the current value input to the motor of the water-cooled pump 50 and the value specified as the valve opening degree, it is possible to detect whether abnormality occurs in the water-cooled pump 50.

As described above, as compared with the refrigeration cycle apparatus 100 according to embodiment 1, the refrigeration cycle apparatus 200 according to embodiment 2 further includes the following features: the water-cooled circuit in which cooling water circulates is formed; the water-cooled pump 50 adapted to circulate the cooling water is provided; the heat-source-side heat exchanger 203 causes heat exchange to be performed between cooling water and refrigerant; the pressure-reducing device 4 is an expansion valve adapted to expand refrigerant by adjusting the opening degree of the valve; and by changing the flow rate of cooling water which flows from the water-cooled pump 50, with the degree of superheat at the heat-source-side heat exchanger 203 controlled by the controller 20 to be kept constant, it is possible to detect whether abnormality occurs in the water-cooled pump 50 based on the current value input to the motor of the water-cooled pump 50 and the value specified as the valve opening degree of the pressure-reducing device 4.

Embodiment 3

Next, a refrigeration cycle apparatus according to embodiment 3 will be described. Regarding embodiment 3, the following description is made with respect to the case where the refrigeration cycle apparatus 100 according to embodiment 1 described above is used in air-conditioning for vehicles such as an electric train.

[Configuration of Refrigeration Cycle Apparatus]

Figure 12:
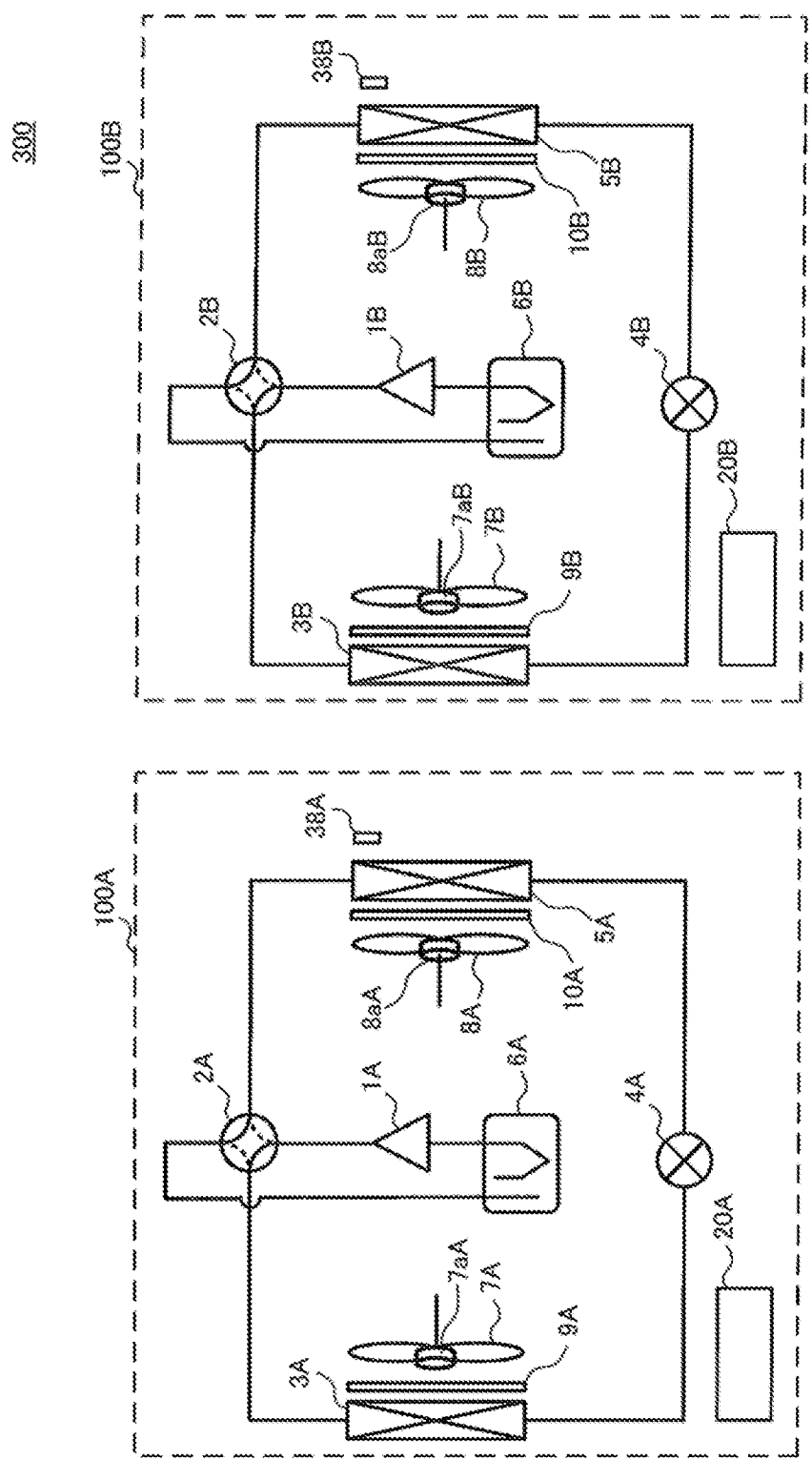
FIG. 12 is a block diagram illustrating an example of the configuration of a refrigeration cycle apparatus according to embodiment 3.

FIG. 12 is a block diagram illustrating an example of the configuration of a refrigeration cycle apparatus 300 according to embodiment 3. As illustrated in FIG. 12, the refrigeration cycle apparatus 300 is made up of two systems of refrigeration cycle apparatuses 100A and 1006. As each of the refrigeration cycle apparatuses 100A and 1006, a refrigeration cycle apparatus which has the same configuration as or a similar configuration to that of the refrigeration cycle apparatus 100 according to embodiment 1 as described above can be applied.

The refrigeration cycle apparatus 100A includes a compressor 1A, a refrigerant flow switching device 2A, a heat-source-side heat exchanger 3A, a pressure-reducing device 4A, a use-side heat exchanger 5A, and an accumulator 6A, and these devices form a refrigeration cycle.

Also, the refrigeration cycle apparatus 100A includes a controller 20A. The heat-source-side heat exchanger 3A is provided with a heat-source-side fan 7A to be driven by a fan motor 7aA. The use-side heat exchanger 5A is provided with a use-side fan 8A to be driven by a fan motor 8aA.

Furthermore, a heat source side filter 9A is provided between the heat-source-side heat exchanger 3A and heat-source-side fan 7A. A use-side filter 10A is provided between the use-side heat exchanger 5A and the use-side fan 8A.

The refrigeration cycle apparatus 100B includes a compressor 1B, a refrigerant flow switching device 2B, a heat-source-side heat exchanger 3B, a pressure-reducing device 4B, a use-side heat exchanger 5B, and an accumulator 6B, and these devices provide a refrigeration cycle.

Also, the refrigeration cycle apparatus 100B includes a controller 20B. The heat-source-side heat exchanger 3B is provided with a heat-source-side fan 7B to be driven by a fan motor 7aB. The use-side heat exchanger 5B is provided with a use-side fan 8B to be driven by a fan motor 8aB.

Furthermore, a heat source side filter 9B is provided between the heat-source-side heat exchanger 3B and the heat-source-side fan 7B. A use-side filter 10B is provided between the use-side heat exchanger 5B and the use-side fan 8B.

[Operation of Refrigeration Cycle Apparatus]

In the refrigeration cycle apparatus 300, each of the two systems of refrigeration cycle apparatuses 100A and 100B operates in the same manner as or in a manner similar to that of the refrigeration cycle apparatus 100 according to embodiment 1, and their detailed descriptions will thus be omitted.

It should be noted that the refrigeration cycle apparatus 300 according to embodiment 3 is mounted on a vehicle. While the vehicle is traveling, the operation of the refrigeration cycle apparatus 300 stops frequently, since there are areas where disconnection occurs due to changes of substations. Also, during the service of the vehicle, the number of passengers greatly varies, for example, from one operating hour to another, and from one operation section to another, and the temperature of air, etc., are thus unstable.

Therefore, when the load is unstable, for example, the number of passengers changes to change the load, even if the above specific operation mode is set, and an abnormal detection processing is performed, it is hard to accurately detect whether abnormality occurs. Thus, in the refrigeration cycle apparatus 300 according to embodiment 3, it is preferable that the specific operation mode be set when the load is not changed and the refrigeration cycle apparatus 300 is operated without being stopped, for example, when the vehicle is located in a carbam or before the service of the vehicle is started.

It should be noted that whether the load is constant can be detected, for example, based on temperatures detected by temperature sensors 38A and 38B adapted to detect an ambient temperature of a room, e.g., an inner temperature of the vehicle. To be more specific, for example, when the variation of each of the temperatures detected by the temperature sensors 38A and 38B within a specific time period falls within a preset range, the controllers 20A and 20B determine that the load on the vehicle on which the refrigeration cycle apparatus 300 is mounted is not changed, and sets the specific operation mode.

As described above, in the refrigeration cycle apparatus 300 according to embodiment 3, the specific operation mode is set when it is detected that the load on the vehicle is not changed. Therefore, even if the refrigeration cycle apparatus 300 is mounted on a vehicle or the like the load on which varies greatly, it is possible to appropriately detect whether abnormality occurs.

REFERENCE SIGNS LIST 1, 1A, 1B compressor 2, 2A, 2B refrigerant flow switching device
3, 3A, 3B heat-source-side heat exchanger 4, 4A, 4B pressure-reducing device 5, 5A, 5B use-side heat exchanger 6, 6A, 6B accumulator
7, 7A, 7B heat-source-side fan 7a, 7aA, 7aB fan motor 8, 8A, 8B use-side fan 8a, 8aA, 8aB fan motor 9, 9A, 9B heat-source-side filter 10, 10A, 10B use-side filter 20, 20A, 20B controller 21 sensor information analysis unit 22 abnormality determination unit 23 storage unit 24 operation control unit 25 operation mode setting unit 28 display unit 30 operation input unit
31, 32 pressure sensor 33, 34, 35, 36, 37, 38, 38A, 38B temperature sensor 39, 40 current sensor 50 cooling water pump 51, 52 temperature sensor 100, 100A, 100B, 200, 300 refrigeration cycle apparatus
110 monitoring system 101 local controller 102 monitoring device
103 storage device 105 network 121 computing unit 122 control unit 123 communication unit 124 display unit 120 operation input unit 131 communication unit 132 storage unit 203 heat-source-side heat exchanger

The invention claimed is:

1. A refrigeration cycle apparatus in which a compressor, a heat-source-side heat exchanger, a pressure-reducing device and a use-side heat exchanger are connected by pipes to allow refrigerant to be circulated as a refrigeration cycle, the refrigeration cycle apparatus comprising a controller configured to control an operation of each of the compressor, the heat-source-side heat exchanger, the pressure-reducing device and the use-side heat exchanger, wherein with a degree of superheat at one of the use-side heat exchanger and the heat-source-side heat exchanger controlled to be kept constant, the controller sets an operation mode to a specific operation mode for determining whether abnormality occurs based on states of the compressor, the heat-source-side heat exchanger, the pressure-reducing device and the use-side heat exchanger in a case where an operating state of one of a plurality of element devices to be controlled by the controller is changed from a first state to a second state, the element devices including the compressor, the heat-source-side heat exchanger, the pressure-reducing device and the use-side heat exchanger.

2. The refrigeration cycle apparatus of claim 1, wherein:
the pressure-reducing device is an expansion valve configured to expand refrigerant by adjusting an opening degree of the valve; and
the controller detects whether abnormality occurs in the pressure-reducing device based on a value specified as the opening degree of the pressure-reducing device in a case where a compressor frequency of the compressor is changed.

3. The refrigeration cycle apparatus of claim 1, further comprising:
a use-side fan configured to supply air to the use-side heat exchanger, the use-side fan being driven by a fan motor; and
a use-side filter provided between the use-side heat exchanger and the use-side fan,
wherein the pressure-reducing device is an expansion valve configured to expand refrigerant by adjusting an opening degree of the valve; and
the controller detects whether abnormality occurs in the fan motor or the use-side filter based on an input current value to the fan motor of the use-side fan and a value specified as the opening degree of the pressure-reducing device in a case where a fan rotation speed of the use-side fan is changed, with a degree of superheat at the use-side heat exchanger controlled to be kept constant.

4. The refrigeration cycle apparatus of claim 3, wherein the controller detects whether abnormality occurs in the use-side heat exchanger based on the degree of superheat at the use-side heat exchanger and the value specified as the valve opening degree of the pressure-reducing device.

5. The refrigeration cycle apparatus of claim 1, further comprising:
a heat-source-side fan configured to supply air to the heat-source-side heat exchanger, the heat-source-side fan being to be driven by a fan motor; and
a heat source side filter provided between the heat-source-side heat exchanger and the heat-source-side fan,
wherein the pressure-reducing device is an expansion valve adapted to expand refrigerant by adjusting an opening degree of the valve; and
the controller detects whether abnormality occurs in the fan motor or the heat source side filter based on an input current value to the fan motor of the heat-source-side fan and a value specified as a valve opening degree of the pressure-reducing device in a case where a fan rotation speed of the heat-source-side fan is changed, with a degree of superheat at the heat-source-side heat exchanger controlled to be kept constant.

6. The refrigeration cycle apparatus of claim 5, wherein the controller detects whether abnormality occurs in the heat-source-side heat exchanger based on the degree of superheat at the heat-source-side heat exchanger and the specified value of the valve opening degree of the pressure-reducing device.

7. The refrigeration cycle apparatus of claim 1,
wherein a water-cooled circuit in which cooling water is circulated is formed,
the refrigeration cycle apparatus further comprising a cooling water pump configured to circulate the cooling water,
wherein the heat-source-side heat exchanger causes heat exchange to be performed between the cooling water and the refrigerant;
wherein the pressure-reducing device is an expansion valve configured to expand refrigerant by adjusting an opening degree of the valve; and
the controller detects whether abnormality occurs in the cooling water pump based on a current value input to a motor of the cooling water pump and a value specified as the opening degree of the pressure-reducing device in a case where a flow rate of the cooling water which flows from the cooling water pump is changed, with a degree of superheat at the heat-source-side heat exchanger controlled to be kept constant.

8. The refrigeration cycle apparatus of claim 1, the refrigeration cycle apparatus being mounted on a vehicle, and
wherein the controller sets the operation mode to the specific operation mode when a load on the vehicle is stabilized.

9. The refrigeration cycle apparatus of claim 1, further comprising an operation input unit configured to output an operation signal according to an operation, wherein
the controller sets the operation mode to the specific operation mode based on the operation signal.

10. The refrigeration cycle apparatus of claim 9, wherein:
the operation input unit is provided at a remote location; and
the controller includes a communication unit configured to receive the operation signal output from the operation input unit by remote control, and set the operation mode to the specific operation mode based on the operation signal received via the communication unit.

11. The refrigeration cycle apparatus of claim 1, further comprising a display unit configured to display information indicating the detected abnormality.

* * * * *